July 18, 1939.  H. C. MAYERS  2,166,872
COIN-CONTROLLED DEVICE FOR REGULATING GAS FLOW
Filed Feb. 17, 1937  3 Sheets-Sheet 1

INVENTOR
H. C. Mayers.
By Lucy & Lucy,
Attys

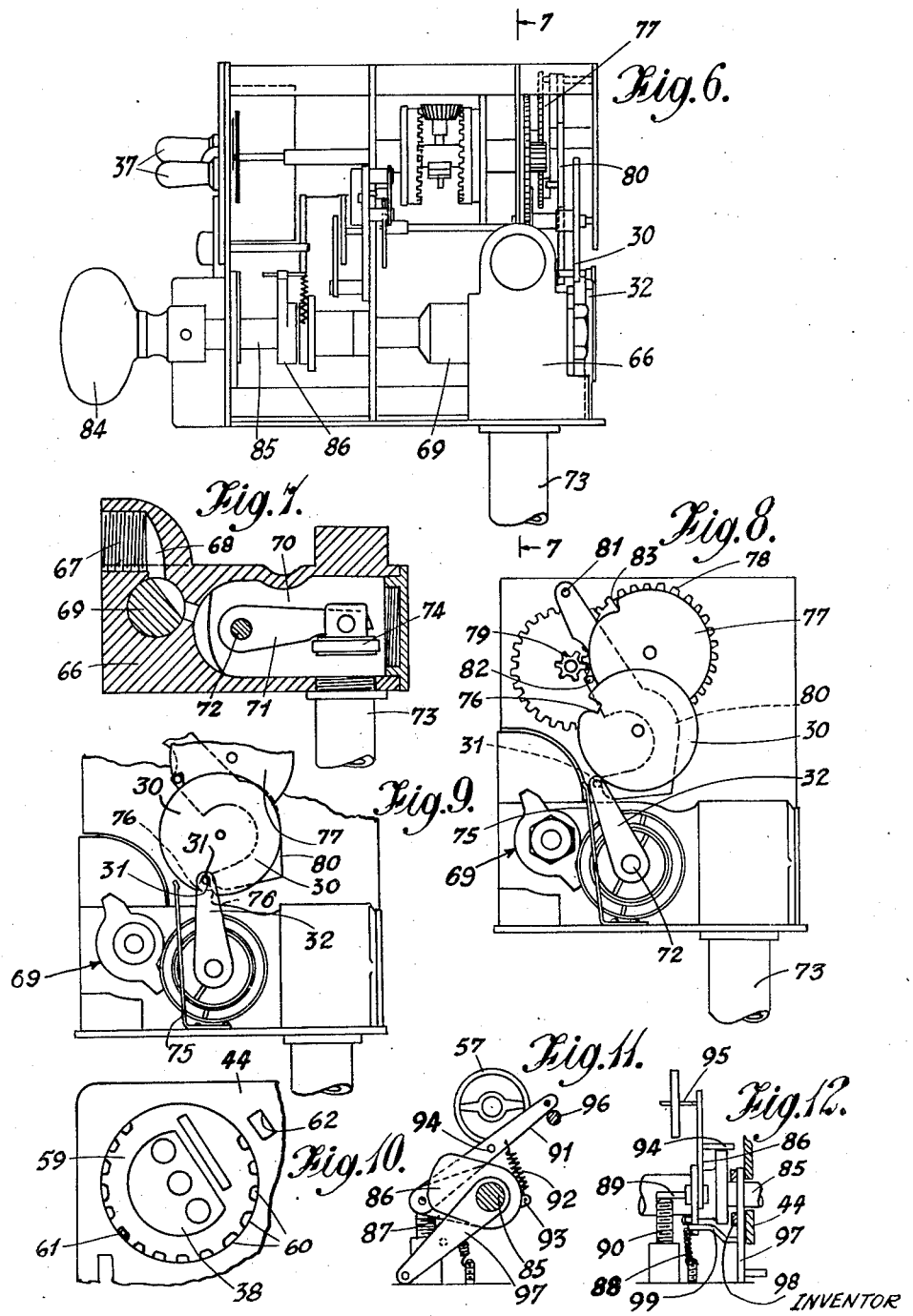

July 18, 1939.    H. C. MAYERS    2,166,872
COIN-CONTROLLED DEVICE FOR REGULATING GAS FLOW
Filed Feb. 17, 1937    3 Sheets-Sheet 3
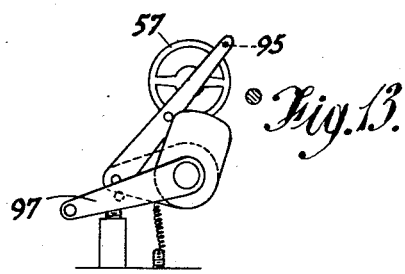
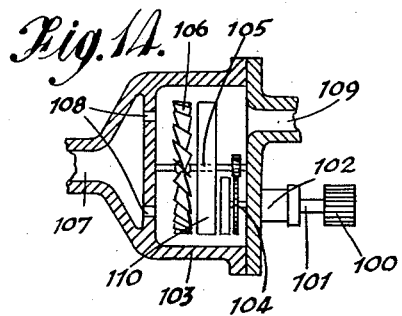
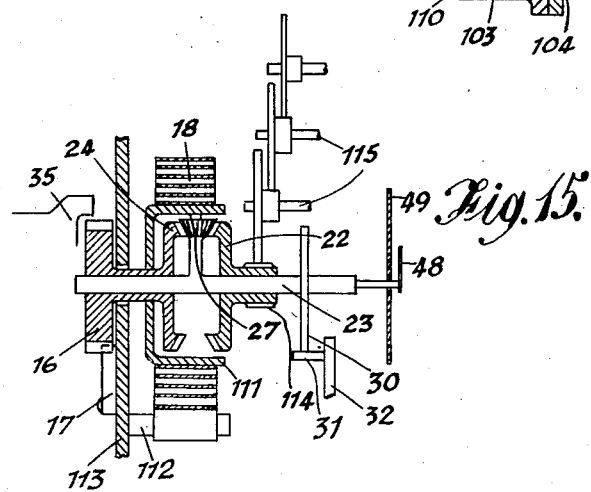
INVENTOR
*H. C. Mayers.*
By *Lacey & Lacey*.
Attys.

Patented July 18, 1939

2,166,872

UNITED STATES PATENT OFFICE 2,166,872

COIN-CONTROLLED DEVICE FOR REGULATING GAS FLOW

Howard Clive Mayers, London, England

Application February 17, 1937, Serial No. 126,291
In Great Britain February 17, 1936

7 Claims. (Cl. 161—9)

This invention relates to coin-controlled dispensing devices for the supply of gas.

It is the primary object of the present invention to provide an improved and particularly compact mechanism whereby gas may be dispensed by a coin-controlled mechanism either on a time basis or upon a basis which at least in part depends upon the rate at which the supply is being consumed. It is a further object to provide an improved construction of coin-controlled clockwork driven apparatus, which is arranged to supply gas for a predetermined time depending upon the number of coins inserted. The apparatus which is provided with manual control means for cutting off the supply of gas and stopping the clockwork so that the entire quantity of gas need not be used in one uninterrupted interval, is also provided with running-down means which enable the clockwork to run down even when the gas supply has been cut off by the said manual control means.

According to the invention, in coin-controlled mechanism for the supply of gas is provided a spring driven regulating device comprising a clockwork motor, a differential gear having elements, one element being actuated during the winding-up of the clockwork, a second element by the running-down of the clockwork, and a third element being thereby returned to a predetermined zero position, a gas valve, and means operatively connected with the third element which permit the valve to close and which stop the clockwork at the zero position, the said means subsequently maintaining the valve in its closed position under the force exerted by the spring of the clockwork motor.

In particular, the means which close the valve, and maintain it in its closed position under the force exerted by the spring of the clockwork mechanism comprise a cam operatively connected to the third member of the differential gear having a notch in its periphery, a cam follower and a leaf spring which presses the follower lightly into the notch, the movement of the follower towards the bottom of the notch, and the consequent closing of the valve, being completed by rotation of the cam under the action of the spring of the clockwork motor, while the force subsequently exerted by the said spring of the clockwork, after the clockwork has stopped, serves to maintain the valve in its closed position.

Further objects of the invention and the manner in which it is carried out will become clear from the following description.

The invention is illustrated by way of example in the accompanying drawings in which Figure 1 is a diagrammatic plan view of the winding mechanism and the differential gear;

Figure 6 is a side elevation of the apparatus;

Figure 7 is a sectional elevation of the master gas valve taken on the line 7—7 of Figure 6;

Figure 8 is a rear elevation of the apparatus showing the primary and secondary cam discs with the apparatus working;

Figure 9 is a fragmentary view corresponding to Figure 8 showing both cam discs in their neutral or zero position;

Figure 10 is a fragmentary front elevation of the coin-freed winding device with the cover plate removed;

Figure 11 is a front view of the manual means used for stopping and starting the clockwork motor, the manual gas tap being in its "on" position;

Figure 12 is a side elevation corresponding to Figure 11;

Figure 13 is a view corresponding to Figure 11 with the manual tap in its "off" position and the running down means in action;

Figure 14 is a sectional diagram illustrating a modified method of controlling the running down of the clockwork motor; and Figure 15 is a sectional diagram showing a modified differential gear arrangement.

Figure 1:
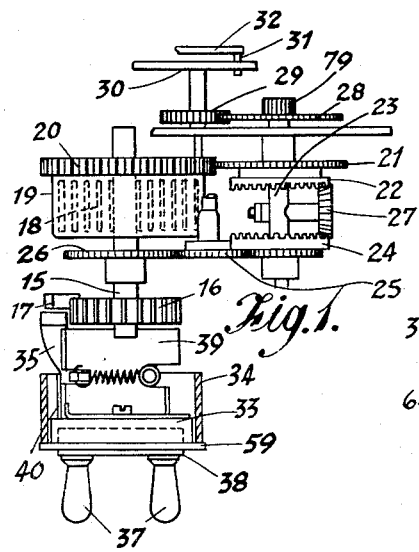

Referring to Figure 1 the clockwork motor comprises in essence a winding arbor 15 to which is attached a ratchet wheel 16 cooperating with a fixed pawl 17, said arbor 15 being secured in the usual manner to the centre of a spiral spring 18, the outer end of which latter is connected with a barrel 19 rotatably mounted upon the arbor 15. The barrel 19 is formed with teeth 20 which mesh directly with a wheel 21 formed in one with a crown wheel 22. This crown wheel 22 is rotatably mounted upon a spindle 23 and constitutes the second member of the differential gear. The first member comprises a crown wheel 24 which is also rotatably mounted upon the spindle 23, and which meshes by way of an idler wheel 25 with a wheel 26 secured to the arbor 15, the gear ratio between the wheels 24 and 26 being equal to that between the wheels 21 and 20. The spindle 23 forms the carrier for a planet wheel 27 constituting the third element of the differential gear, and this spindle is connected by gear wheels 28 and 29 with a substantially circular cam disc 30 cooperating with a pin 31 carried by a follower arm 32. The position of the latter determines whether the supply is available or is interrupted.

Figure 2:
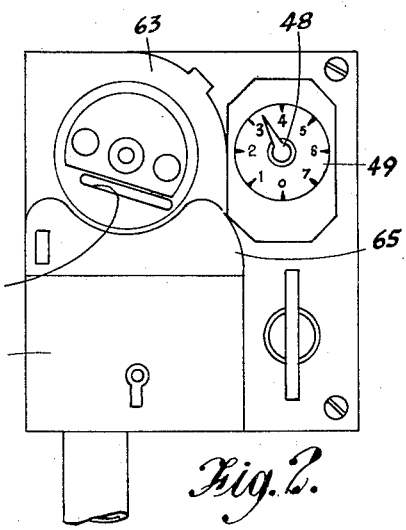
Figure 2 is a front view of the complete apparatus.

The winding mechanism of the apparatus, which is shown diagrammatically in Figure 1, comprises a coin-controlled device 33 which is fitted within a stationary tubular barrel 34 carried by the body of the apparatus, said coin-controlled device 33 being fitted with a finger 35 which upon the insertion of a coin in the slot 36 (see Figure 2) is moved into engagement with the appropriate tooth of the ratchet wheel 16. Thereafter rotational movement of the twin handles 37 first causes the plate 38 to cover the coin slot 36 and then bodily rotates the part 39 of the device together with the finger 35 and the coin. When the latter comes opposite to a delivery slot 40 it is ejected and the finger 35 is withdrawn from the ratchet wheel 16.

Figure 3:
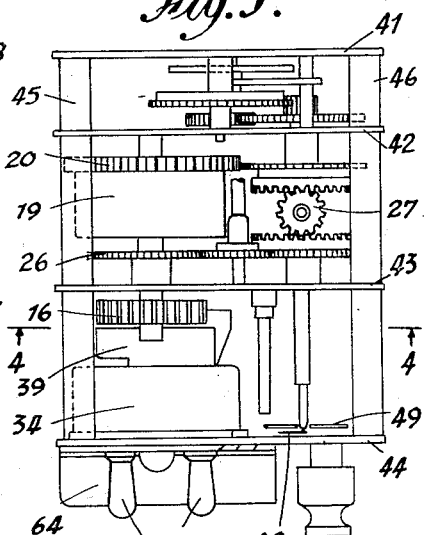
Figure 3 is a plan corresponding to Figure 2.
Figure 5:
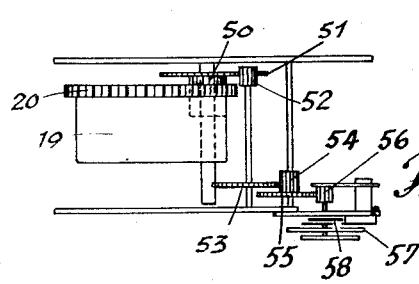
Figure 5 is a diagrammatic plan showing the wheel train for driving the balance wheel escapement mechanism.

In one practical embodiment which is herein described as an example, it will be seen from Figure 3 that the mechanism is mounted between four main plates 41, 42, 43 and 44 which are held in spaced relationship by supports 45, 46 and 47. The spindle 23 carrying the planet wheel 27 is fitted at its front end with a hand 48 which cooperates with a scale 49 visible through a window at the front of the apparatus.

In order to control the running down of the spring 18 the teeth 20 upon the barrel 19, in addition to meshing with the wheel 21, also engage a pinion 50 and this drives through a train of gear wheels 51—56, a time controlled escapement device having a balance wheel 57 and escapement wheel 58. Thus, the running down of the clockwork motor which comprises principally the barrel 19, the differential gear 22, 24, 27 and the wheel train 50—58 is controlled on a time basis, and the period for which the gas supply is available depends upon the initial setting of the coin-freed winding device 33 and the number of coins inserted.

As will be seen in Figure 10 the plate 59 forming the stationary part of the coin-controlled mechanism 33 is notched at intervals around its periphery at 60 for engagement with the fixed pin 61, the initial setting of the plate 59 serving to determine the amount by which the clockwork motor can be wound for each inserted coin. A rectangular hole 62 in the plate 44 serves for the attachment of a cover plate 63 holding the plate 59 in place, while the insertion and locking of a coin box 64 having a flange 65 prevents unauthorised tampering with the apparatus and in particular with the setting of the plate 59.

The means used for controlling the flow of gas through the apparatus are shown more particularly in Figures 6 to 9, and comprise mainly a valve body 66 which is positioned at the rear of the apparatus as will be seen in Figure 6, said body being formed with an inlet passage 67 which communicates by a passage 68 with a manually actuated gas tap 69 from which the gas passes into a cavity 70 containing an angularly movable valve arm 71 secured to a spindle 72. The outlet from the chamber 70 consists of a pipe 73, the opening of which can be closed by means of a pad 74 carried pivotally upon the outer end of the arm 71. Externally, the spindle 72 is fitted with the cam follower arm 32 as shown in Figure 8, and the pin 31 at the extremity of this is normally urged towards the periphery of the main cam disc 30 by a leaf spring 75. The cam disc 30 is formed at one point in its periphery with a notch 76, and the spring 75 is so arranged that as the disc 30 rotates in an anti-clockwise direction from the position shown in Figure 8 the spring 75 causes the pin 31 to engage the notch, after which the latter carries the pin 31 forward to the position shown in Figure 9, thus moving the valve arm 71 downwardly and shutting off the supply of gas.

In order to allow gas to be supplied for a relatively long time by the insertion of a number of coins a secondary cam disc 77 is fitted with a gear wheel 78, which meshes with a pinion 79 upon the spindle 23 so that one revolution of the cam 77 represents several complete turns of the main cam 30. An arm 80 pivoted at 81 is fitted with a pin 82 engaging the periphery of the cam 77, and at its lower end the arm 80 is adapted to push upon the pin 31 and lift it off the cam 30. When the cam 77 is in its zero or neutral position the pin 82 is disposed within a notch 83, but during the winding up of the clockwork motor the arm 80 moves the pin 31 away from the cam 30 before the latter has made one complete revolution, thereby preventing the pin 31 from dropping into the notch 76 until both cams have been returned to their zero or neutral position.

In order to allow the user to stop the gas supply at will the manual tap 69 is fitted with a handle 84 disposed at the front of the apparatus, and the connecting spindle 85 is fitted with a cam 86 which is utilised for stopping the clockwork motor when the supply is not being used. The mechanism for this purpose is illustrated mainly in Figures 4, 11, 12 and 13. A crank arm 87 is freely pivoted upon the spindle 85 and is normally drawn downwards by a spring 88 so that a pin 89 engages with a screw-threaded stop 90. At its extremity the crank arm 87 carries a lever 91 which is urged in a clockwise direction as viewed in Figure 11 owing to the provision of a coiled tension spring 92 anchored to a lug 93 carried upon the crank arm 87. A pin 94 upon the lever 91 cooperates with the cam 86, while a wire 95 serves to arrest the motion of the balance wheel 57 by bearing against its periphery. A stop 96 limits the movement of the lever 91. When the gas is turned off during normal operation by the handle 84 the parts assume the positions shown in Figure 4, and upon moving the handle 84 in an anti-clockwise direction the pin 94 suddenly escapes past the cam 86 and the wire 95 consequently sweeps tangentially away from the balance wheel, thus giving an impulse to the latter. When the tap 69 is next turned off the engagement of the cam 86 with the pin 94 first lifts the lever 91, and as said pin suddenly rides over the cam 86 the wire 95 sharply engages with the balance wheel 57.

Figure 4:
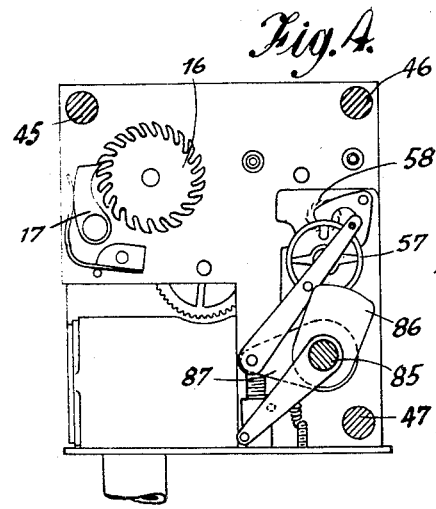
Figure 4 is a front elevation partly in section as taken on the line 4—4 of Figure 3.

Means are also incorporated in this part of the apparatus for the purpose of allowing the proprietor or other authorised persons to cause the clockwork motor to run down without the tap 69 being turned on. For this purpose a secondary crank arm 97 is freely mounted upon the spindle 85, but is held in slipping frictional engagement with the end plate 44 by means of a strip 98 composed of springy material. A wire 99 carried by the arm 97 is bent upwardly as shown in Figure 12, and is used for lifting the crank arm 87 when the arm 97 is raised to the position seen in Figure 13. This lifts the wire 95 clear of the balance wheel 57 and allows the clockwork motor to operate until such time as the master gas valve 71 is fully closed. The arm 97 does not require a special resetting movement, as the mechanism is arranged so that the next time the tap 84 is moved to its "on" position the cam 86 itself bears upon the wire 99 and moves the arm 97 to its normal position as seen in Figures 4 and 11.

It will be seen that in use the amount by which the clockwork motor is allowed to run down corresponds exactly with the extent to which the spring 18 is wound up, and that said spring need never become completely unwound. Indeed it is desirable that with the cams 30 and 77 in their neutral or zero positions there should be a decided force exerted by the spring 18 as this, acting through the planet wheel 27 and the cam 30, securely holds the pad 74 against the end of the pipe 73. In this way the whole force exerted by the spring 18 is taken by the pad 74 and the gear train 50—58 is relieved of stress.

The manner in which the differential gearing is operated by the winding-up and running-down of the clockwork so as to control the gas valve is as follows:

When the mechanism is in its zero position, the side of the notch 76 in the primary cam 30 bears against the follower 31, so as to maintain the valve 71 firmly closed, through the medium of the follower arm 32 and the spindle 72 under the action of the main spring 18, which latter is not fully run down.

During the winding-up of the clockwork mechanism the ratchet wheel 16 serves to rotate the wheel 26, the idler wheel 25, and the crown wheel 24 of the first member of the differential gear. This latter wheel 24 in turn serves to run the planet wheel 27 round the periphery of the crown wheel 22 constituting the second member of the differential gear, and thus rotates the spindle 23, which in turn serves to rotate the cams 30 and 77. During the initial movement of the cams 30 and 77 from their zero position, the notch 76 of the cam 30 causes the follower 31 to move out of the notch 76 against the action of the leaf spring 75, the follower 31 thus rotating the arm 32 and the spindle 72 and lifting the valve pad 74 off its seat. During the winding-up of the clockwork the barrel 19, wheel 21 and crown wheel 22 are stationary, as also are the wheels 50 to 58 associated therewith, the balance wheel 57 being held from rotation by the wire 95 carried by the lever 91, and the manual valve 69 being closed.

When the manual valve 69 is opened by rotation of the handle 84, the lever 91 is allowed to move sharply so as to sweep the wire 95 away from the balance wheel 57 to start the clockwork as previously explained. During the running-down of the clockwork which then follows, the barrel 19, wheel 21 and crown wheel 22 are rotated as also are the wheels 50 to 58 associated therewith, while the wheel 26, the idler wheel 25, and the crown wheel 24 remain stationary. Thus the planet wheel 27 now runs round the periphery of the crown wheel 24 and rotates the spindle 23 in the reverse direction, which in turn serves to return the cams 30 and 77 to the position in which the follower 31 can enter the notch 76 of the primary cam 30. The action of the main spring 18 now serves to hold the valve pad 74 firmly on its seat since it tends to rotate the primary cam 30 still further thereby transmitting force through the follower 31, the follower arm 32, and the spindle 72, to the valve 71.

It is not essential that the valve 71 should be worked on a fixed time basis, as means may be arranged, if desired, whereby the rate at which the gas is used is taken into account to a certain extent. Thus, a modification is illustrated in Figure 14. In place of the gear train escapement 50—58 the drum 19 is connected with a pinion 100 carried upon a shaft 101 which passes through a packing gland 102 into the interior of a casing 103. A set of gear wheels 104 within the casing connects the spindle 101 with a spindle 105 carrying a windmill rotor 106 having a series of inclined vanes. The gas supply enters at 107 and passing through a circular series of nozzles 108 impinges upon the rotor 106 and encourages its rotation, the gas leaving the casing by a passage 109 and from thence passing to the valve body 66 as in the previous example. The rotor 106 which is fitted with a diametral vane 110 serving as an air brake is arranged, so that under the normal influence of the spring 18 it rotates relatively slowly, but when gas is being used the impulses given to the rotor 106 speed up the latter approximately in accordance with the rate at which the gas is being used.

A somewhat modified arrangement of differential gear and clockwork spring is shown in Figure 15, in which the spring 18 is attached at its inner end with a differential barrel 111 and at its outer end is carried by a stationary pin 112 fixed to a convenient frame plate 113. The barrel 111 contains the first member 24 of the differential gear, the second member 22, and the third member comprising a planet wheel 27 carried on the spindle 23 as before. The wheel 24 is freely rotatable upon the spindle 23 and is connected by a sleeve with the ratchet wheel 16 having a pawl 17 and arranged to be wound by a coin-controlled device having a finger 35 as before. The second member 22 is similarly carried on a freely rotatable sleeve formed with a pinion 114 which drives the gear train of the clockwork motor indicated at 115. The spindle 23 carries or is connected with the cam disc 30 for actuating the pin 31 of the follower arm 32, and is also fitted with the indicating hand 49 for showing the extent of use whch is due to the user. The operation of this modified device is the same as before. The insertion of a coin permits the ratchet wheel to be wound, and as the wheel 22 is held stationary by the gear train 115 a rotational movement is imparted to the planet carrier and spindle 23 to which the drum 111 is attached. This winds the spring 18 and simultaneously moves forward the cam 30, thus opening the master device such as a gas valve and advancing the hand 49. Upon cessation of winding the force of the spring is imparted to the wheel 22 (the wheel 24 being anchored by the ratchet wheel 16) and thus drives the train of gears 115 and an escapement or equivalent regulating device. As the spring 18 unwinds, the spindle 23 is returned to its neutral or zero position at which the supply is cut off as before.

It will be understood that the invention is not limited to the specific examples given and that it may be used for controlling any fluid supply by embodying a suitable master controlling device; a switch would obviously be used if the apparatus was intended for an electricity supply.

What I claim is:

1. In coin-controlled mechanism for the supply of gas, a spring driven regulating device comprising a clockwork motor, a differential gear having elements, one element being actuated during the winding-up of the clockwork, a second element actuated by the running-down of the clockwork, and a third element being thereby returned to a predetermined zero position, a gas valve, and means operatively connected with the third element permitting the valve to close and stopping the clockwork at the zero position, said means subsequently maintaining the valve in its closed position under the force exerted by the spring of the clockwork motor.

2. In coin-controlled mechanism for regulating the supply of gas, the combination of a spring driven clockwork motor, a differential gear comprising a first element which is operated during the winding-up of the clockwork, a second element which is operated by the running-down of the clockwork, and a third element which is moved in one sense by the first element and in the reverse sense by the second element, a cam operatively connected with the third element, a cam follower cooperating with the cam, and a gas valve connected with the cam follower, the force exerted by the spring of the clockwork motor serving to rotate the cam into a predetermined zero position in which the valve is permitted to close and then being transmitted by the cam to the valve, whereby the latter is firmly held in its closed position and the clockwork is stopped.

3. In coin-controlled mechanism for regulating the supply of gas, the combination of a spring driven clockwork motor, a differential gear comprising a first element which is operated during the winding-up of the clockwork, a second element which is operated by the running-down of the clockwork, and a third element which is moved in one sense by the first element and in the reverse sense by the second element, a cam operatively connected with the third element, a cam follower, a gas valve connected with the follower, a notch in the periphery of the cam, and a leaf spring which presses the follower lightly into the notch, the movement of the follower towards the bottom of the notch, and the consequent closing of the valve, being completed by rotation of the cam under the action of the spring of the clockwork motor and the force subsequently exerted by the said clockwork spring after the clockwork has stopped serving to maintain the valve in its closed position.

4. In coin-controlled mechanism for regulating the supply of gas, the combination of a spring driven clockwork motor, a differential gear comprising a first element which is operated by the winding-up of the clockwork, a second element which is operated by the running-down of the clockwork and a third element which is displaced by the first element and returned by the second, a main cam operatively connected with the third element, a cam follower, a gas valve connected with the follower, a notch in the periphery of the main cam into which the follower can move to close the valve, the said notch then cooperating with the follower under the action of the spring of the clockwork motor to hold the valve firmly in its closed position, and a secondary cam which rotates at a different speed from that of the main cam and prevents the follower from engaging the notch in the main cam until a predetermined number of revolutions of the main cam have been made.

5. In coin-controlled mechanism for regulating the supply of gas, the combination of a spring driven clockwork motor, a differential gear comprising a first element which is operated during the winding-up of the clockwork, a second element which is operated by the running-down of the clockwork and a third element which is moved in one sense by the first element and in the reverse sense by the second element, a cam operatively connected with the third element, a cam follower associated with the cam, a gas valve connected with the follower, a notch in the periphery of the cam which in its zero position permits the follower to close the valve and then engages the follower to hold the valve firmly closed under the action of the spring of the clockwork motor, a manually controlled gas valve, a feeler associated with the manual valve which normally prevents the operation of the clockwork when the manual valve is closed, and running-down means which serve to displace the feeler and permit the clockwork to operate even if the manually controlled valve is closed.

6. In coin-controlled mechanism for regulating the supply of gas, the combination of a spring driven clockwork motor, a differential gear comprising a first element which is operated during the winding-up of the clockwork, a second element which is operated by the running-down of the clockwork and a third element which is moved in one sense by the first element and returned by the second, a cam operatively connected with the first element, a cam follower associated with the cam, a gas valve connected with the cam follower, a notch in the periphery of the cam which in its zero position permits the cam follower to close the valve and then engages the follower to hold the valve closed under the action of the spring of the clockwork motor, a manually controlled gas valve, a feeler associated with the manual valve which normally prevents the operation of the clockwork when the manual valve is closed, and running-down means which serve to displace the feeler and permit the clockwork to operate even when the manual valve is closed, said feeler and means being returned to their normal condition by actuation of the manual valve.

7. In coin-controlled mechanism for the supply of gas, a spring driven clockwork motor, a differential gear comprising three elements, a first element which is operated by winding up the clockwork, a second element which is operated by the running down of the clockwork and a third element which is rotated in one sense by the first element during winding up and moved in the reverse sense by the second element during running down, a cam operatively connected with the third element, a cam follower, a gas valve connected with the follower, a notch in the periphery of the cam, which, when it reaches its zero position during running-down permits the follower to close the valve and then engages the follower under the action of the spring of the clockwork motor to hold the valve closed, and a rotor which is connected with the clockwork and is disposed in the gas stream so as to regulate the rate of running down of the clockwork in accordance with the rate of flow of gas.

HOWARD CLIVE MAYERS.